United States Patent [19]
Lin

[11] Patent Number: 5,855,410
[45] Date of Patent: Jan. 5, 1999

[54] ANGULAR POSITION TRANSFORMING DEVICE FOR A BICYCLE SADDLE

[75] Inventor: Ming-Shyang Lin, Taichung Hsien, Taiwan

[73] Assignee: Giant Manufacturing Co., Ltd., Taichung Hsien, Taiwan

[21] Appl. No.: 87,004

[22] Filed: May 29, 1998

[51] Int. Cl.[6] ....................................................... B62J 1/00
[52] U.S. Cl. ................................ 297/215.15; 297/195.1; 297/335; 248/219.2
[58] Field of Search ........................... 297/195.1, 215.13, 297/215.15, 331, 333, 335, 336; 248/219.2; 403/83, 84, 119

[56] References Cited

U.S. PATENT DOCUMENTS

| | | | |
|---|---|---|---|
| 4,836,604 | 6/1989 | Romano | 297/215.15 |
| 5,347,155 | 9/1994 | Herling | 297/215.5 X |
| 5,441,327 | 8/1995 | Sanderson | 297/195.1 |
| 5,568,958 | 10/1996 | Chen | 297/215.15 |

FOREIGN PATENT DOCUMENTS

| 408954 | 4/1934 | United Kingdom | 297/195.1 |
|---|---|---|---|

*Primary Examiner*—Peter R. Brown
*Attorney, Agent, or Firm*—Merchant, Gould, Smith, Edell, Welter & Schmidt

[57] ABSTRACT

An angular position transforming device shifts a bicycle saddle relative to a seat post which has front and rear upright portions, and an anchoring head portion connected to the front and rear upright portions and having two opposite anchoring walls and a sliding wall joining transversely the anchoring walls. The device includes a support frame having right and left lug portions fixed to a rear portion of the saddle about a first pivot, and a front seat portion with an upper support wall, a releasably retaining device to retain angular positions of the lug portions on the anchoring portion between a position of use, and a lifted position. A detent lever includes a fulcrum pivoted under the upper support wall of the front seat portion around a second pivot parallel to the first pivot, an actuating arm extending outwardly of the upper support wall so as to be operated manually, and a catch arm disposed at an opposite side of the actuating arm relative to the fulcrum portion for engaging releasably the front upright portion when the lug portions are in the position of use.

7 Claims, 3 Drawing Sheets

ANGULAR POSITION TRANSFORMING DEVICE FOR A BICYCLE SADDLE

BACKGROUND OF THE INVENTION

1. Field of the Invention

The invention relates to an angular position transforming device, more particularly to an angular position transforming device for shifting the angular position of a bicycle saddle relative to a seat tube of a bicycle.

2. Description of the Related Art

A bicycle saddle is generally fixed on a bicycle seat post that is inserted into a seat tube. For battery-operated bicycles or multi-purpose bicycles, such as a battery or a tool kit, are sometimes carried on the seat tube. Since no angular position transforming device is used in the mounting of the bicycle saddle relative to the seat tube, it is difficult to move the saddle upward relative to the seat tube for replacement of the battery or for fetching tools from the tool kit.

SUMMARY OF THE INVENTION

Therefore, the object of this invention is to provide an angular position transforming device for shifting the angular position of a bicycle saddle relative to a seat tube.

Accordingly, the angular position transforming device of this invention is capable of shifting the angular position of a bicycle saddle relative to a seat post. The saddle has a front portion and a rear portion which extends from the front portion in a longitudinal direction. The seat post has opposite front and rear upright portions, and an anchoring head portion disposed above and interconnecting upper parts of the front and rear upright portions. The head portion has opposite right and left anchoring walls that face in directions transverse to the front and rear upright portions, and a sliding wall that joins transversely the right and left anchoring walls. The seat post further has an insert portion that extends downwardly and that is adapted to be inserted into a seat tube of the bicycle. The angular position transforming device includes a support frame with a spaced pair of right and left lug portions, a releasably retaining device, a detent lever, and a biasing device. The right and left lug portions are adapted to be mounted fixedly to the rear portion of the saddle and are adapted to be mounted pivotally on the anchoring head portion around a first pivot axis with the right and left anchoring walls disposed inboard to the right and left lug portions, respectively. The support frame further includes a front seat portion which extends forwardly from the right and left lug portions in a longitudinal direction of the latter, and which has an upper support wall that faces upwardly in a direction transverse to the first pivot axis. The releasably retaining device retains angular positions of the right and left lug portions relative to the anchoring head portion between a position of use, where the releasably retaining device engages a higher position on the sliding wall, and a lifted position, where the releasably retaining device engages a lower position on the sliding wall relative to the higher position and opposite to the front upright portion relative to the first pivot axis. The detent lever has a fulcrum portion pivoted under the upper support wall around a second pivot axis parallel to the first pivot axis, an actuating arm that extends longitudinally and outwardly of the upper support wall so as to be operated manually, and a catch arm disposed at an opposite side of the actuating arm relative to the fulcrum portion and adapted to engage releasably the front upright portion of the seat post when the right and left lug portions are in the position of use. The biasing means biases the catch arm to engage the front upright portion of the seat post.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
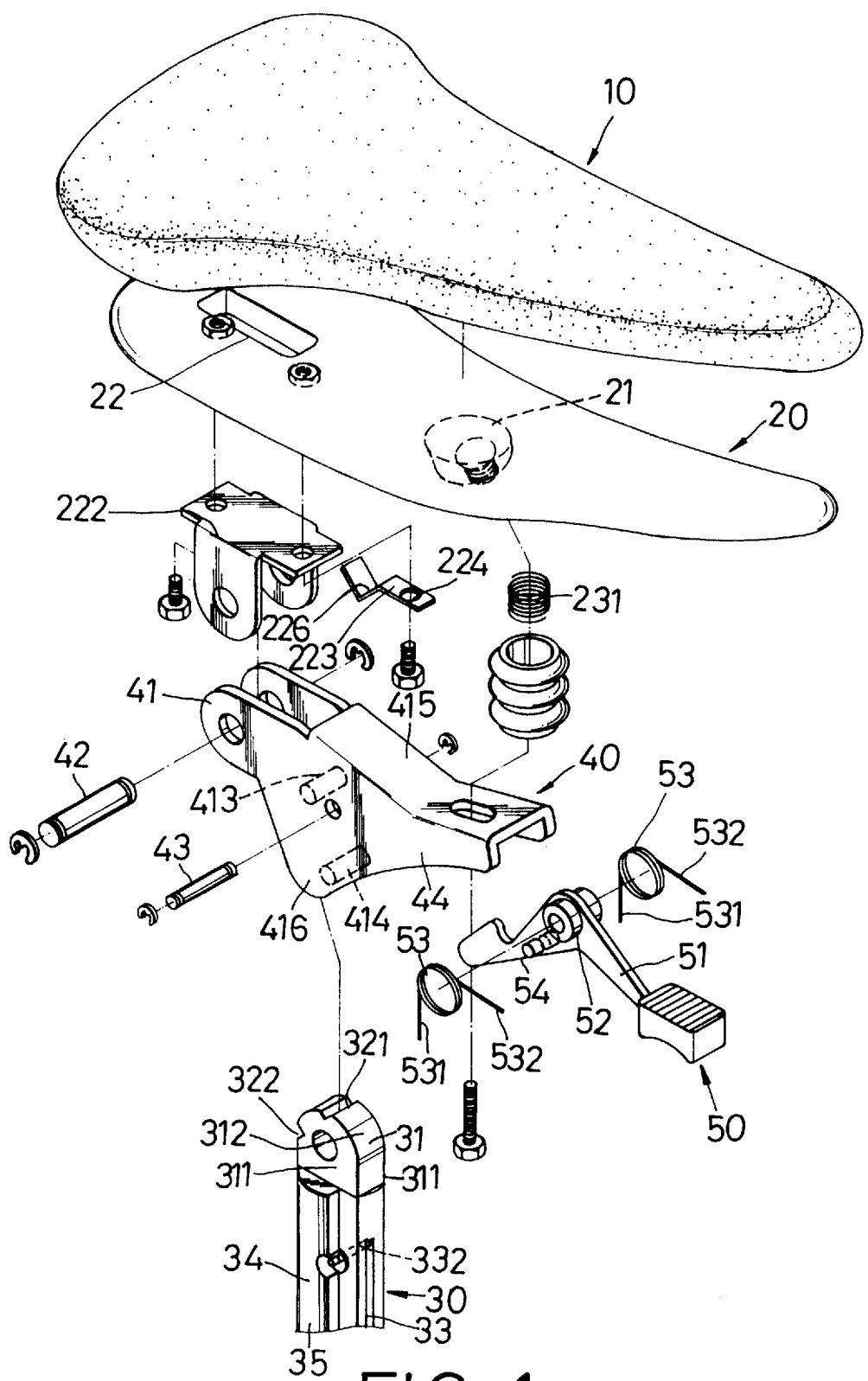
FIG. 1 is an exploded view of a preferred embodiment of an angular position transforming device of this invention for shifting the angular position of a bicycle saddle relative to a seat post.
Figure 2:
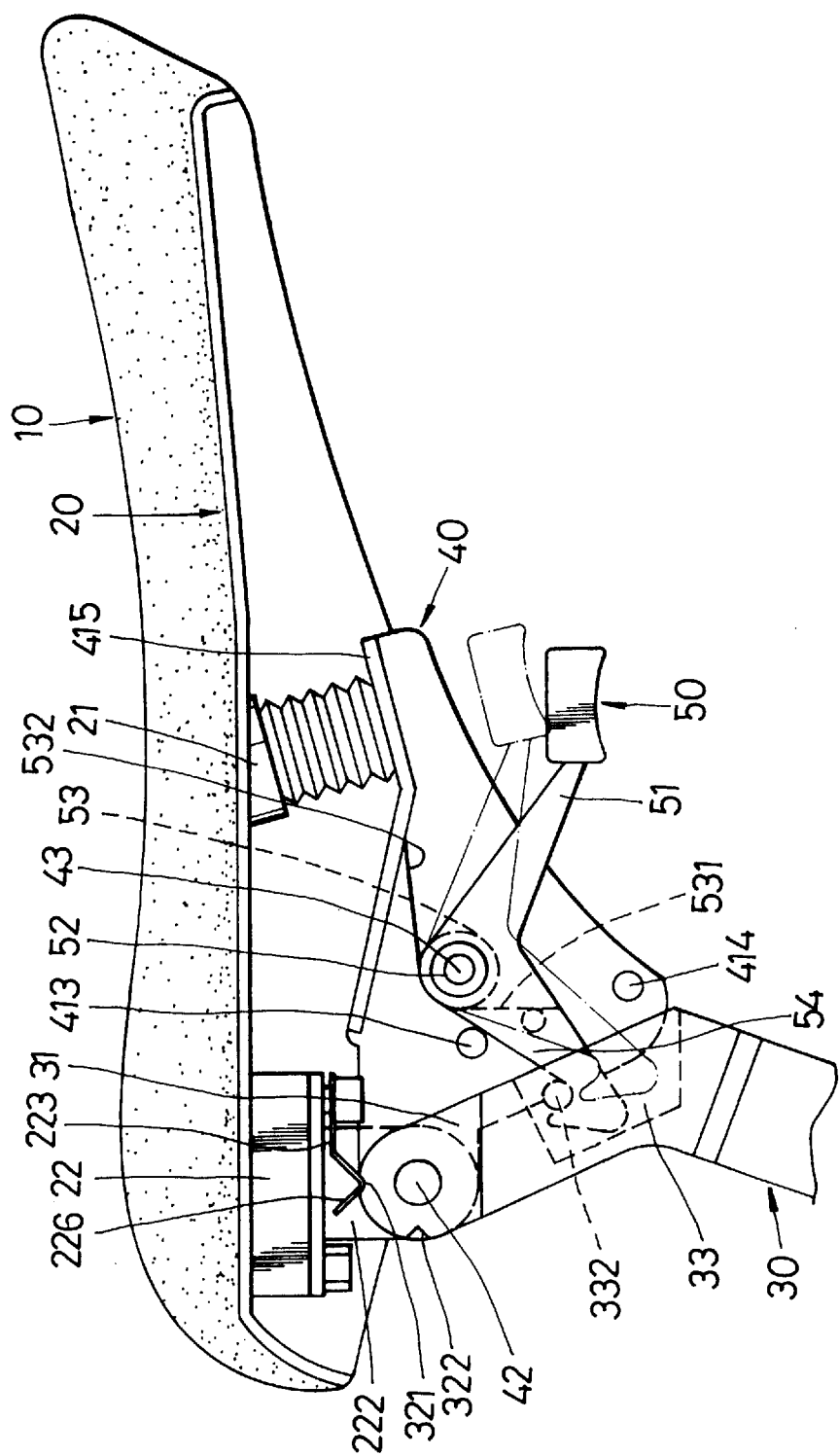
FIG. 2 is a schematic view of the preferred embodiment of this invention.

Referring to FIGS. 1 and 2, the preferred embodiment of an angular position transforming device 10 of this invention is shown to be adapted for shifting angular position of a bicycle saddle 20 relative to the seat post 30.

As shown, the saddle 20 has a front portion 21 and a rear portion 22 that extends from the front portion 21 in a longitudinal direction of the saddle 20. The seat post 30 has opposite front and rear upright portions 33, 34, and an anchoring head portion 31 disposed above and interconnecting upper parts of the front and rear upright portions 33, 34. The head portion 31 has opposite right and left anchoring walls 311 which face in directions transverse to the front and rear upright portions 33, 34, and a sliding wall 312 joining transversely the right and left anchoring walls 311. The seat post 30 further has an insert portion 35 that extends downwardly from the front and rear upright portions 33, 34 so as to be adapted to be inserted into a seat tube of the bicycle (not shown).

The preferred embodiment includes a support frame 40 with a spaced pair of right and left lug portions 41, a releasably retaining device, a detent lever 50, and a biasing device 53.

The right and left lug portions 41 extend in the longitudinal direction of the saddle member 20, and are adapted to be mounted fixedly to the rear portion 22 via a bracket 222, and are adapted to be mounted pivotally on the anchoring head portion 31 around a first pivot 42 with the right and left anchoring walls 311 disposed inboard to the right and left lug portions 41, respectively. The support frame 40 further includes a front seat portion 44 that extends forwardly from the right and left lug portions 41 in the longitudinal direction, and that has an upper support wall 415 upwardly facing in a direction transverse to the first pivot 42.

The releasably retaining device retains the angular positions of the right and left lug portions 41 relative to the anchoring head portion 31 between a position of use, where the releasably retaining device engages the sliding wall 312 at a higher position on the latter, and a lifted position, where the releasably retaining device engages the sliding wall 312 at a position than the higher position and opposite to the front upright portion 33 relative to the first pivot 42.

The detent lever 50 has a fulcrum portion 52 pivoted under the upper support wall 415 around a second pivot 43 parallel to the first pivot 42, an actuating arm 51 that extends longitudinally and outwardly of the upper support wall 415 so as to be operated manually, and a catch arm 54 which is disposed at an opposite side of the actuating arm 51 relative to the fulcrum portion 52 and which is adapted to engage releasably the front upright portion 33 when the right and left lug portions 41 are in the position of use.

The biasing device 53 biases the catch arm 54 to engage the front upright portion 33.

In the preferred embodiment, the front seat portion 44 further includes two spaced mounting plates 416 that extend downwardly from the upper support wall 415 for mounting the fulcrum portion 52 therebetween via the second pivot 43. The biasing device 53 is a coil spring sleeved on the fulcrum portion 52, and has a first end 532 abutting against the upper support wall 415, and a second end 531 that biases the catch arm 54 to engage the front upright portion 33. The releasably retaining device includes upper and lower grooves 321, 322 which are formed on the sliding wall 312 and which extend parallel to the first pivot 42, and a leaf spring 223 which has a fixed end 224 adapted to be fixed to the rear portion 22 of the saddle 20, and a distal end 226 selectively engaging one of the upper groove 321 and the lower grooves 322 so as to dispose the right and left lug portions 41 between the position of use and the lifted position.

Figure 3:
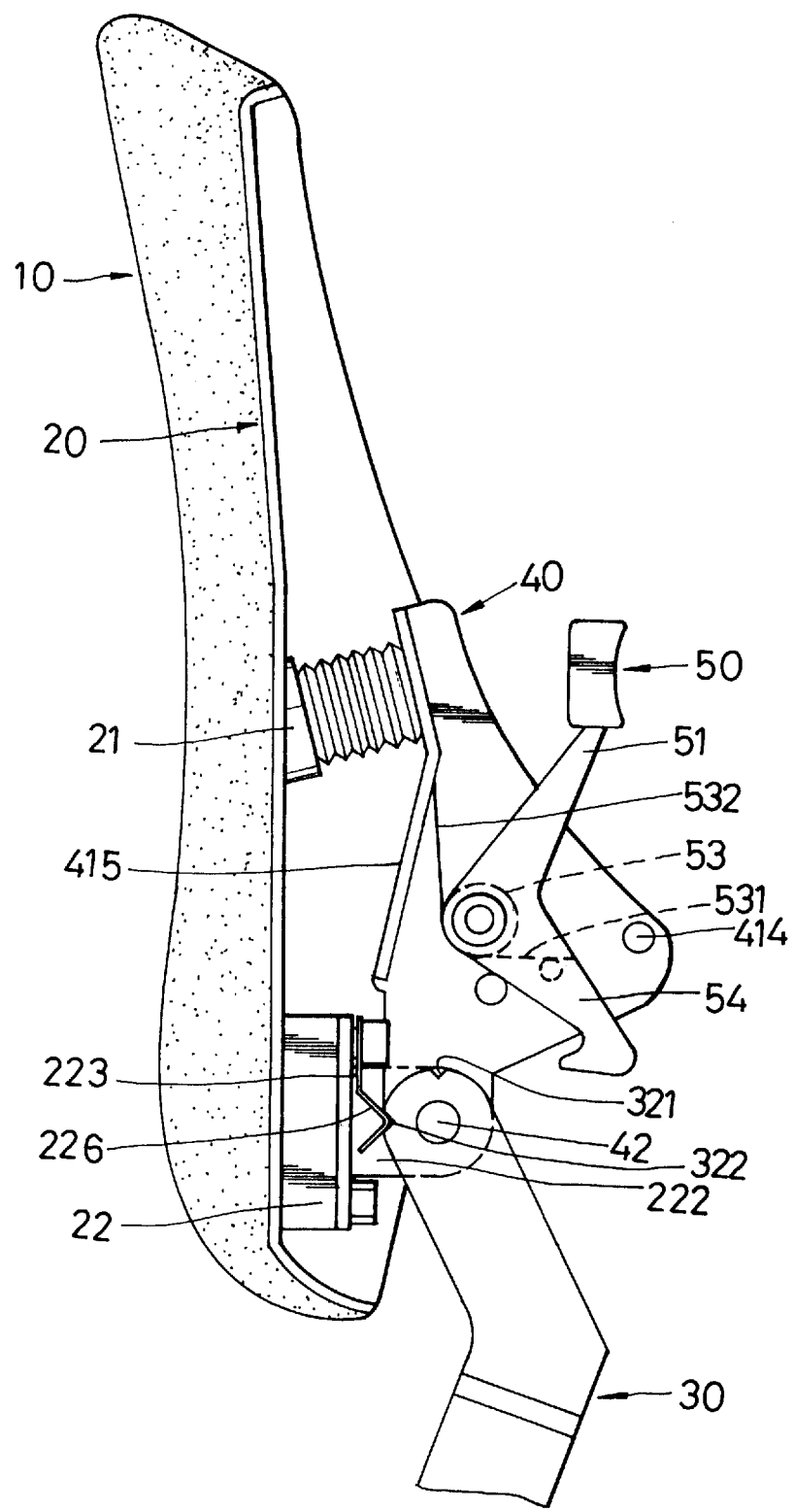
FIG. 3 illustrates how an angular position of the preferred embodiment is shifted to a lifted position.

A cushion spring 231 is disposed between the upper support wall 415 and the front portion of the saddle 20 to absorb shock. An engagement stud 332 is adapted to be fixed on the front upright portion 33 parallel to the first pivot 42 for releasably engaging the catch arm 54. The front seat portion 44 further has two limit pins 413, 414 disposed between the mounting plates 416 on two sides of and parallel to the second pivot 43 so as to limit movement of the catch arm 54 therebetween. After being released from the stud 322, the catch arm 54 is retained by the limit pin 413 when the right and left lug portions 41 are in the lifted position, as best shown in FIG. 3.

With this invention thus explained, it is apparent that numerous modifications and variations can be made without departing from the scope and spirit of this invention. It is therefore intended that this invention be limited only as indicated in the appended claims.

I claim:

1. An angular position transforming device for shifting angular position of a bicycle saddle relative to a seat post, the saddle having a front portion and a rear portion that extends from the front portion in a longitudinal direction, the seat post having opposite front and rear upright portions, and an anchoring head portion disposed above and interconnected upper parts of the front and rear upright portions, the head portion having opposite right and left anchoring walls that face in directions transverse to the front and rear upright portions, and a sliding wall transversely joining the right and left anchoring walls, the seat post further having an insert portion that extends downwardly and that is adapted to be inserted into a seat tube of the bicycle, said angular position transforming device comprising:

a support frame including opposite right and left lug portions that extend rearwardly in said longitudinal direction and that are spaced apart from each other, said right and left lug portions being adapted to be mounted fixedly to the rear portion of the saddle and being adapted to be mounted pivotally on the anchoring head portion around a first pivot axis with the right and left anchoring walls disposed inboard to said right and left lug portions, respectively; and a front seat portion extending forwardly from said right and left lug portions in said longitudinal direction, and having an upper support wall that faces upwardly in a direction transverse to direction of said first pivot axis;

means for releasably retaining angular positions of said right and left lug portions relative to the anchoring head portion between a position of use, where said releasable retaining means is adapted to engage the sliding wall at an uppermost position on the sliding wall, and a lifted up position, where said releasable retaining means is adapted to engage the sliding wall at a position lower than the uppermost position and opposite to the front upright portion relative to said first pivot axis;

a detent lever having a fulcrum portion pivoted under said upper support wall around a second pivot axis parallel to said first pivot axis, an actuating arm extending longitudinally and outwardly of said upper support wall so as to be operated manually, and a catch arm disposed at an opposite side of said actuating arm relative to said fulcrum portion and adapted to releasebly engage holding means on the front upright portion when said right and left lug portions are in the position of use; and means for biasing said catch arm to engage the holding means on the front upright portion.

2. The angular position transforming device as defined in claim 1, wherein said front seat portion further includes two spaced mounting plates extending downwardly from said upper support wall for mounting said fulcrum portion therebetween via said second pivot axis.

3. The angular position transforming device as defined in claim 2, wherein said biasing means includes a coil spring sleeved on said fulcrum portion and having a first end abutting against said upper support wall and a second end biasing said catch arm to engage the front upright portion.

4. The angular position transforming device as defined in claim 3, wherein said releasable retaining means includes upper and lower grooves formed on the sliding wall and extending parallel to said first pivot axis, and a leaf spring having a fixed end adapted to be fixed to the rear portion and a distal end selectively engaging one of said upper and lower grooves so as to dispose said right and left lug portions between said position of use and said lifted up position.

5. The angular position transforming device as defined in claim 2, wherein said front seat portion further includes two limit pins disposed between said mounting plates on two sides of and parallel to said second pivot axis so as to limit movement of said catch arm therebetween.

6. The angular position transforming device as defined in claim 1, further comprising a cushion spring adapted to be disposed between the upper support wall and the front portion of the saddle to absorb shock.

7. The angular position transforming device as defined in claim 1, wherein said holding means comprise an engagement stud adapted to be fixed on the front upright portion parallel to said first pivot axis for releasably engaging said catch arm.

* * * * *